(12) United States Patent
North et al.

(10) Patent No.: US 10,144,259 B2
(45) Date of Patent: Dec. 4, 2018

(54) BALL JOINT RELOCATION KIT FOR SUSPENSION LIFTED VEHICLES

(71) Applicant: Powers and Sons, LLC, Montpelier, OH (US)

(72) Inventors: Ron North, West Bloomfield, MI (US); Sawyer Miller, Archbold, OH (US); Jesse Raver, Flat Rock, MI (US); Christopher Fink, Archbold, OH (US)

(73) Assignee: POWERS AND SONS, LLC, Montpelier, OH (US)

( * ) Notice: Subject to any disclaimer, the term of this patent is extended or adjusted under 35 U.S.C. 154(b) by 218 days.

(21) Appl. No.: 15/086,501

(22) Filed: Mar. 31, 2016

(65) Prior Publication Data

US 2017/0282662 A1  Oct. 5, 2017

(51) Int. Cl.
   *B60G 7/00*    (2006.01)
   *B62D 7/18*    (2006.01)
   *B25B 27/02*   (2006.01)

(52) U.S. Cl.
   CPC ............ *B60G 7/005* (2013.01); *B25B 27/023* (2013.01); *B60G 2204/148* (2013.01); *B60G 2204/416* (2013.01); *B60G 2206/50* (2013.01); *B62D 7/18* (2013.01)

(58) Field of Classification Search
   CPC ........ B62D 7/18; B25B 27/023; B60G 7/005; B60G 2204/416; B60G 2204/148; B60G 2206/50
   See application file for complete search history.

(56) References Cited

U.S. PATENT DOCUMENTS

| | | | | |
|---|---|---|---|---|
| 1,854,938 | A * | 4/1932 | Jantsch | B62D 17/00 280/93.511 |
| 5,927,918 | A * | 7/1999 | Burger | B60D 1/06 280/513 |
| 6,527,468 | B1 * | 3/2003 | Lindquist | B60G 7/005 403/122 |
| 6,851,688 | B2 * | 2/2005 | Barry | B62D 7/16 280/93.51 |
| 9,643,645 | B2 * | 5/2017 | Dendis | B62D 7/18 |
| 2007/0065227 | A1 * | 3/2007 | Sellers | B60G 7/005 403/122 |
| 2009/0103974 | A1 * | 4/2009 | Dendis | B62D 7/18 403/135 |

FOREIGN PATENT DOCUMENTS

CA   2464162 A1 * 10/2004   ............. B62D 7/228

* cited by examiner

*Primary Examiner* — Karen Beck
(74) *Attorney, Agent, or Firm* — Shumaker, Loop & Kendrick, LLP; James D. Miller

(57) ABSTRACT

A ball joint relocation kit including a ball stud having a ball end, a threaded end, and a shaft with a straight outer diameter, and a sleeve having a tapered outer diameter and a straight inner diameter, wherein the sleeve is adapted to be received in a tapered hole through a steering knuckle from a bottom side, and the ball stud is adapted to be received through the tapered hole and the sleeve from the top side. The ball joint relocation kit can be used to replace an OEM ball stud to relocate the ball joint from below the steering knuckle to above the steering knuckle in suspension lifted vehicles.

17 Claims, 4 Drawing Sheets

BALL JOINT RELOCATION KIT FOR SUSPENSION LIFTED VEHICLES

TECHNICAL FIELD AND BACKGROUND OF THE INVENTION

The present invention relates generally to relocating a ball joint in a suspension lifted or otherwise modified vehicle, and more particularly, to a kit generally including a straight-shafted ball stud and externally-tapered bushing which replace an OEM tapered ball stud such that the ball joint can be relocated above the steering knuckle without having to modify the OEM steering knuckle.

Ball studs are commonly used in vehicular applications to connect steering linkages to suspension components. In one example, a drag link connects a pitman arm to the steering knuckle and converts the sweeping arc of a steering arm to linear motion in the plane of the other steering links, thereby resulting in a pivot of the wheels to be steered. Ball joint locations in various steering linkage geometries are located by the Original Equipment Manufacturer (OEM), and are critical to proper steering dynamics of the vehicle. Post manufacture, vehicles can be modified with suspension lift kits and various other modified chassis components, which require relocation of these ball joints for maintaining good steering dynamics.

FIG. 1 shows one example of a prior art OEM arrangement in which the ball joint is located below the steering knuckle. In this arrangement, the ball stud 10 is inserted from the bottom side of the steering knuckle 12 with the shaft 14 received through a machined hole in the steering knuckle. The machined hole is tapered in the direction of the top end. A portion of the shaft 14 has a matching taper such that the tapered portion of the shaft 14 seats within the tapered hole of the steering knuckle 12 in a tight fit engagement. The ball stud 10 is retained to the steering knuckle 12 by torquing a nut 16 threadably engaged on the shaft 14.

Modifying a vehicle, for example adding a suspension lift kit, requires the ball joint to be relocated from below the steering knuckle to above the steering knuckle. This type of relocation is critical to keep the drag link and track bar parallel in order to maintain the proper steering dynamics.

FIG. 2 shows a current solution for relocating a ball joint above the steering knuckle. The modification requires the steps of: (1) removing the OEM tapered ball stud 10; (2) drilling out the tapered hole in the steering knuckle 12; (3) installing a supplied headed bushing 18 from the top side of the steering knuckle 12; and (4) re-installing the tapered ball stud 10 from the top side of the steering knuckle 12. Some suppliers of aftermarket steering products recommend drilling out the tapered hole in the steering knuckle 12 with a ⅞" diameter drill bit. The supplier provided headed bushing 18 has a matching outer ⅞" diameter and internally-tapered hole that matches the taper of the OEM tapered ball stud 10. The bushing 18 can be slotted and can expand in the hole when the nut 16 is torqued to the proper torque, thereby drawing the ball stud 10 down into the bushing 18.

The drilling process disadvantageously weakens the steering knuckle, is labor intensive and time consuming, and to the average mechanic or do-it-yourselfer, is difficult to machine a perfectly straight hole using a handheld drill, resulting in questionable integrity of the hole and joint. Therefore, what is needed is a solution that obviates the need to have to drill out and thereby compromise the structural integrity of the steering knuckle, as well as ensures straightness and correct alignment in every application.

BRIEF SUMMARY OF THE INVENTION

It is therefore an object of the invention to provide a ball joint relocation kit for a suspension lifted or otherwise modified vehicle.

It is another object of the invention to provide a kit that obviates having to modify an OEM steering knuckle to relocate a ball joint.

It is yet another object of the invention to provide a ball joint relocation kit that is easily installed by an unskilled mechanic or do-it-yourselfer.

To achieve the foregoing and other objects, in one embodiment the present invention provides a ball joint relocation kit including a ball stud having a ball end, a threaded end, and a shaft, the shaft having a straight outer diameter, and a sleeve having a tapered outer diameter and a straight inner diameter, wherein the sleeve is adapted to be received in a tapered hole through a steering knuckle from a bottom side of the steering knuckle, and the ball stud is adapted to be received through the tapered hole and the sleeve from a top side of the steering knuckle.

In another aspect, the tapered hole can taper in a direction of a top end thereof, and an outer diameter of the shaft can be less than a diameter of the tapered hole at the top end.

In another aspect, a taper of the tapered hole can match a taper of the outer diameter of the sleeve.

In another aspect, the ball stud can further include a shoulder adjacent the ball end, the shoulder facing in a direction of and adapted to engage a top mounting surface of the steering knuckle.

In another aspect, the kit can include an internally threaded nut adapted to threadably engage the threaded end of the shaft, and wherein the internally threaded nut can be axially advanced along the shaft in a direction of the ball end to drive the sleeve into the tapered hole and pull the shoulder against the top mounting surface of the steering knuckle.

In another aspect, the sleeve can have an axial passage therethrough and a head at one end adapted to face and engage the internally threaded nut.

In another aspect, an axial length of the sleeve can be greater than a depth of the tapered hole.

In another aspect, a length of the ball stud can be greater than a length of the sleeve and a depth of the tapered hole.

In another aspect, the sleeve can be rigid or elastomeric.

In another embodiment, the present invention provides a ball joint relocation kit for relocating a ball joint from below a vehicle steering knuckle to above the vehicle steering knuckle. The kit includes a ball stud having a ball end, a threaded end, a shoulder, and a shaft, wherein the shaft has a straight outer diameter, and a headed sleeve having a tapered outer diameter and a straight inner diameter, wherein the sleeve is adapted to be received in a tapered hole through the steering knuckle from a bottom side of the steering knuckle, and the ball stud is adapted to be received through the tapered hole and the headed sleeve from a top side of the steering knuckle.

In another aspect, the tapered hole can taper in a direction of a top end thereof, an outer diameter of the shaft can be less than a diameter of the tapered hole at the top end, and the taper of the tapered hole matches the taper of the outer diameter of the headed sleeve.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, the present invention provides a kit for relocating a ball joint in a vehicle. In a particular embodiment, the kit allows a ball joint to be relocated from below the steering knuckle to above the steering knuckle, such that the ball end of the ball stud relocates from below the steering knuckle to above the steering knuckle, at the mounting location of the ball stud to the steering knuckle.

While the kit is described herein with reference to a drag link ball stud and a suspension lifted vehicle, it is envisioned that the kit or one or more parts thereof can be applied to other systems and modifications within and outside of vehicles. Further, while the kit is described herein for use in replacing an OEM ball stud, it is envisioned that the straight-shafted ball stud and headed bushing of the kit can be installed as OEM equipment, thus allowing the option of either top or bottom mounting the ball joint. For example, the ball joint may be bottom mounted from the factory and thereafter relocated to top mount by the customer.

Figure 1:
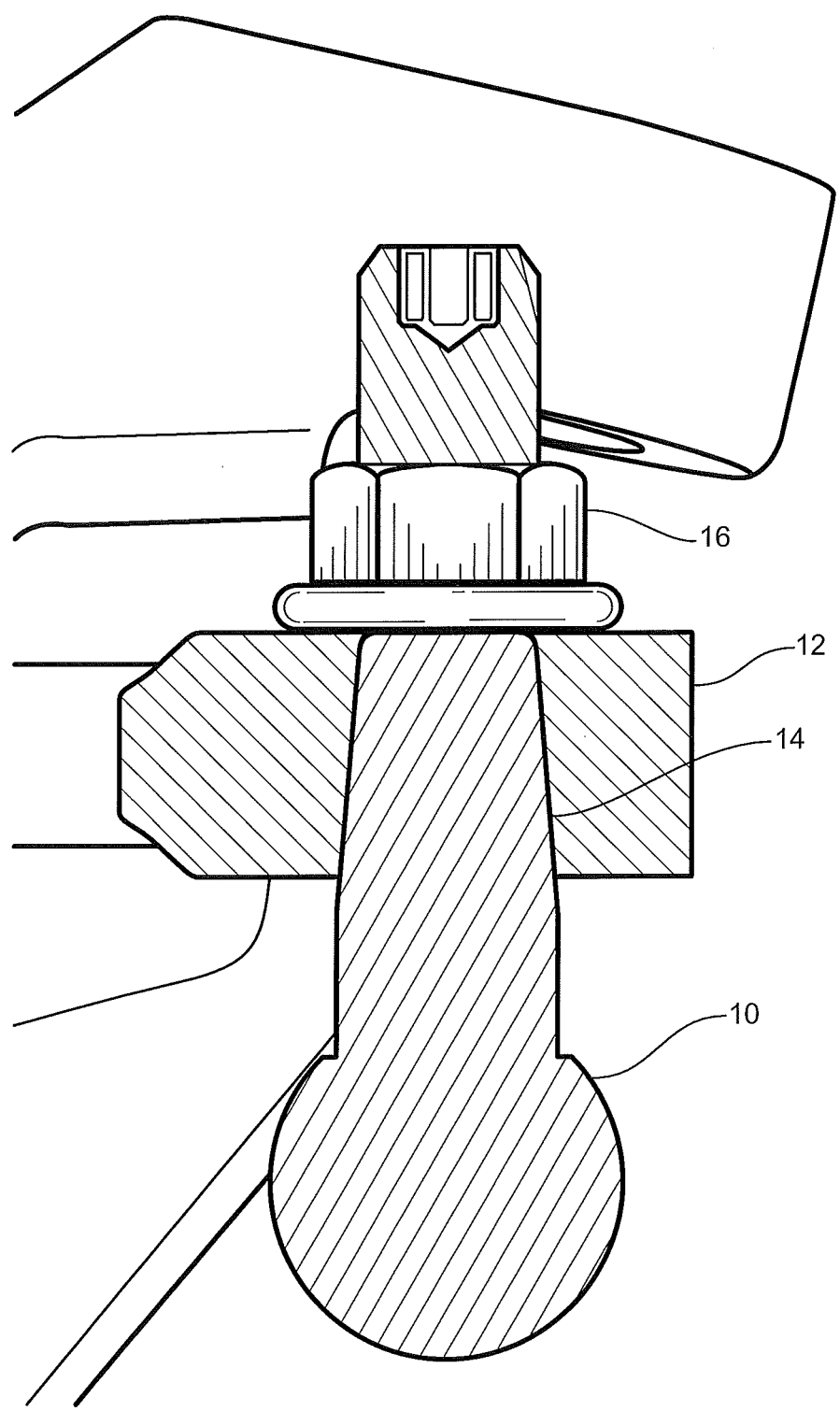
FIG. 1 is a sectional view of a prior art OEM ball joint assembly.
Figure 2:
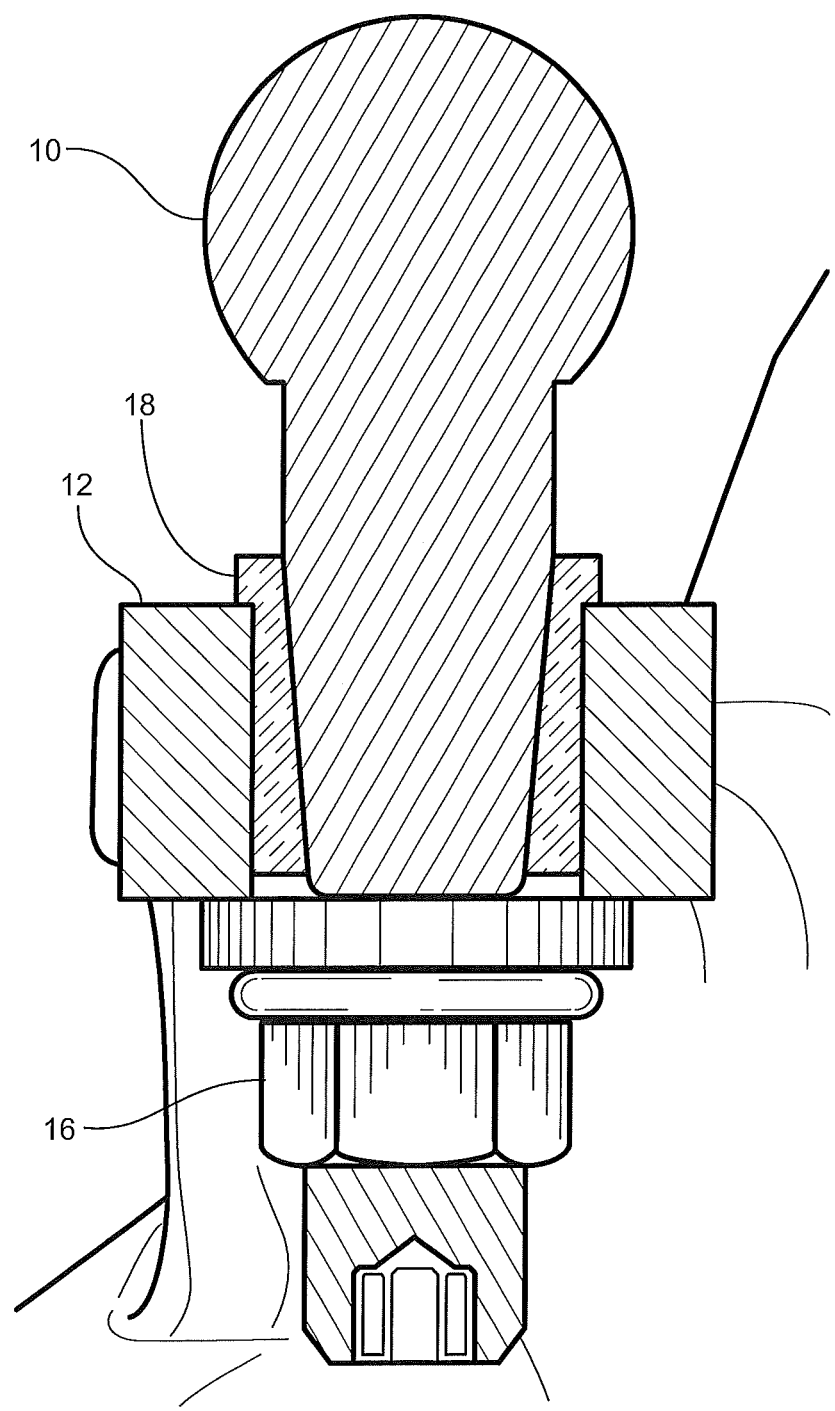
FIG. 2 shows a prior art solution for relocating a ball joint above the steering knuckle in a suspension lifted vehicle.
Figure 3:
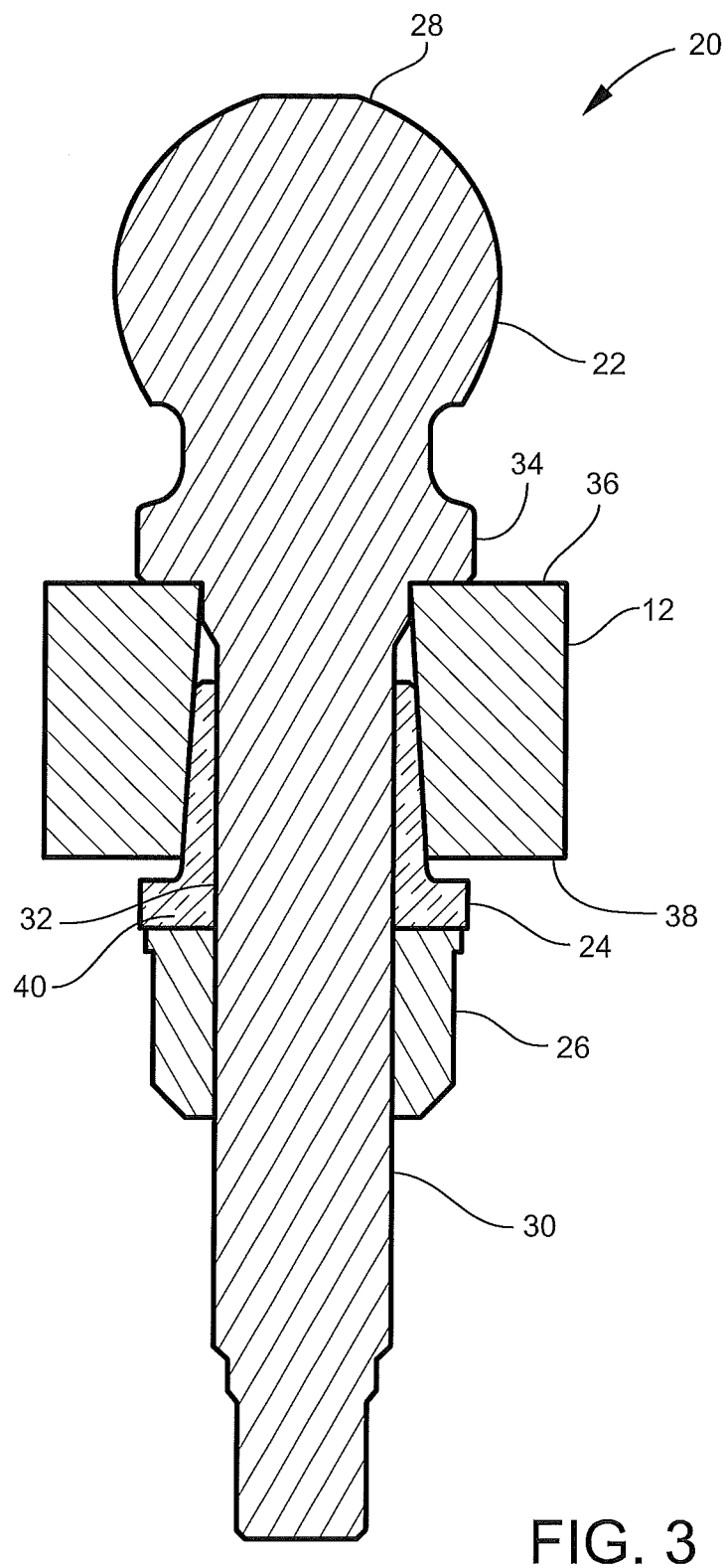
FIG. 3 is a sectional view of a ball joint relocation kit according to an embodiment of the invention.

FIG. 3 shows a ball joint relocation kit 20 according to the present invention. The kit 20 eliminates having to modify the original tapered hole through the existing steering knuckle when relocating a ball joint. The kit 20 generally includes a straight-shafted ball stud 22 and a reverse taper sleeve 24 that are used together to replace the OEM tapered ball stud. The kit can further include a stud nut 26 for locking down the ball stud 22 and the sleeve 24. The stud nut 26 can be optional and the OEM stud nut can be reused when present.

The ball stud 22 generally includes a ball end 28, a threaded end 30 and a shaft 32. The shaft has a straight outer diameter along at least a majority of the length thereof, or at least the portion that is ultimately received within the sleeve 24. The ball stud 22 can further include a shoulder 34 adjacent the ball end 28 that faces in the direction of the top side mounting face 36 of the steering knuckle 12. The shaft 32 can have any length, and preferably has a length longer than the depth of the hole through the steering knuckle such that the threaded end is outside of the hole and accessible for threading on the nut 26.

The shaft 32 has an outer diameter less than the diameter of the hole through the steering knuckle. From the factory, the hole through the steering knuckle 12 tapers in the direction of the top end. The sleeve 24 has a tapered outer diameter that matches the taper of the OEM hole through the steering knuckle 12. The sleeve 24 is inserted into the hole from the bottom side 38 of the steering knuckle. The head 40 at one end of the sleeve 24 limits how far the sleeve 24 can be inserted into the hole. The head 40 also defines a flat annular face that faces in the direction of and engages the a flat face of the nut 26 such that axially advancing the nut 26 along the shaft 32 drives the sleeve 24 further into the hole, and in the case of an elastomeric sleeve, compresses the sleeve 24.

The passageway through the sleeve 24 is straight and matches the straight outer diameter of the shaft 32 where the two engage. During installation, the ball stud can be inserted through the hole in the steering knuckle from the top side 36, followed by sliding the sleeve 24 along the shaft and driving the sleeve into the hole from the bottom side 38, or vice-versa. Once the sleeve 24 and ball stud 22 are installed through their respective sides of the hole and the sleeve surrounding the shaft 32, the nut 26 is threaded onto the shaft 32 and torqued to drive the sleeve 24 further into the hole while forcing the shoulder 34 against the top mounting surface 36 of the steering knuckle.

The sleeve 24 has a tapered outer diameter matching the OEM tapered steering knuckle hole, and has an inner diameter that closely fits the new ball stud 22 straight diameter. The tapered sleeve 24, when pressed up against the tapered hole, can be longer than the hole is deep. This extra sleeve length that extends out from the bottom of the steering knuckle 12 allows the nut 26 to draw the ball stud 22 and sleeve 24 tight.

Figure 4:
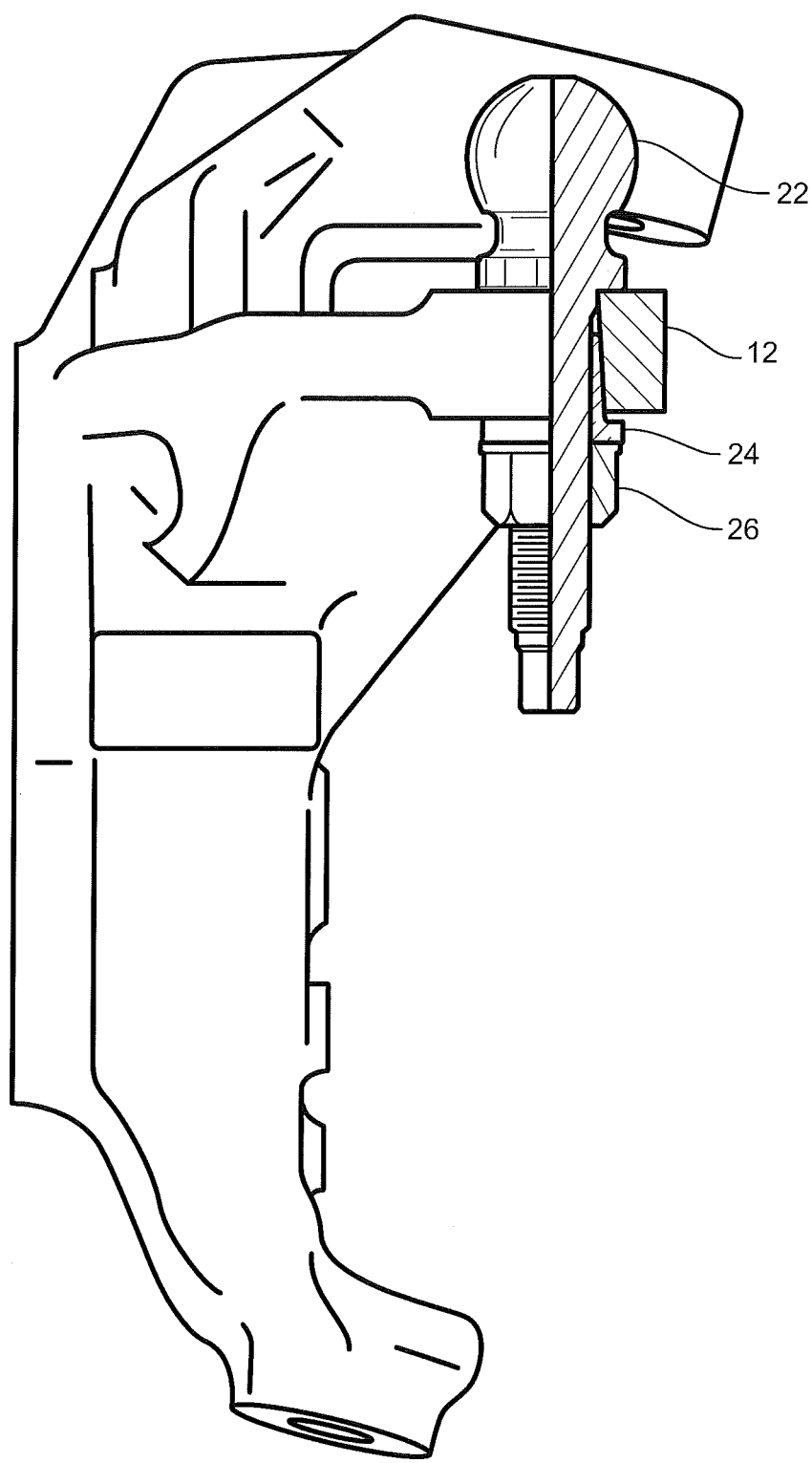
FIG. 4 shows the position of the ball joint after relocation using the relocation kit according to the present invention.

FIG. 4 shows the position of the ball stud 22 after relocation to above the steering knuckle 12, with the sleeve 24 and nut 26 installed. The ball joint relocation kit according to the present invention can be used in numerous applications including, but not limited to, tie rod to steering knuckle, drag link to pitman arm, drag link to tie rod, track bar to frame, etc.

While the foregoing description provides embodiments of the invention by way of example, it is envisioned that other embodiments may perform similar functions and/or achieve similar results. Any and all such equivalent embodiments and examples are within the scope of the present invention and are intended to be covered by the appended claims.

What is claimed is:

1. A ball joint relocation kit for use with a steering knuckle having a tapered hole, the tapered hole including a constant taper as the tapered hole extends from a first end thereof disposed at a bottom side of the steering knuckle to a second end thereof disposed at a top side of the steering knuckle forming a top mounting surface of the steering knuckle, the ball joint relocation kit comprising:
- a ball stud having a ball end, a threaded end, a shaft having a straight outer diameter, and a shoulder adjacent the ball end; and
- a sleeve having a tapered outer diameter and a straight inner diameter, wherein a taper of the outer diameter of the sleeve matches the taper of the tapered hole of the steering knuckle;
- wherein the sleeve is adapted to be received in the tapered hole through a of the steering knuckle from the bottom side of the steering knuckle, wherein the ball stud is adapted to be received through the tapered hole and the sleeve from the top side of the steering knuckle, and wherein the shoulder faces in a direction of and is adapted to engage the top mounting surface of the steering knuckle arranged perpendicular to the shaft.

2. The ball joint relocation kit of claim 1, wherein the tapered hole tapers inwardly as the tapered hole extends from the first end to the second end thereof, and wherein an outer diameter of the shaft is less than a diameter of the tapered hole at the second end thereof.

3. The ball joint relocation kit of claim 1, further comprising an internally threaded nut adapted to threadably engage the threaded end of the shaft, and wherein the internally threaded nut is axially advanced along the shaft in a direction of the ball end to drive the sleeve into the tapered hole and pull the shoulder against the top mounting surface of the steering knuckle.

4. The ball joint relocation kit of claim 3, wherein the sleeve has an axial passage therethrough and a head at one end adapted to face and engage the internally threaded nut.

5. The ball joint relocation kit of claim 1, wherein an axial length of the sleeve is greater than a depth of the tapered hole.

6. The ball joint relocation kit of claim 1, wherein a length of the ball stud is greater than a length of the sleeve and a depth of the tapered hole.

7. The ball joint relocation kit of claim 1, wherein the sleeve is rigid or elastomeric.

8. A ball joint relocation kit for relocating a ball joint from below a vehicle steering knuckle to above the vehicle steering knuckle, the vehicle steering knuckle having a tapered hole, the tapered hole including a constant taper as the tapered hole extends from a first end thereof disposed at a bottom side of the vehicle steering knuckle to a second end thereof disposed at a top side of the vehicle steering knuckle forming a top mounting surface of the vehicle steering knuckle, the ball joint relocation kit comprising:
- a ball stud having a ball end, a threaded end, a shoulder, and a shaft, wherein the shaft has a straight outer diameter; and
- a headed sleeve having a tapered outer diameter and a straight inner diameter, wherein a taper of the outer diameter of the headed sleeve matches the taper of the tapered hole of the vehicle steering knuckle;
- wherein the headed sleeve is adapted to be received in the tapered hole of the vehicle steering knuckle from the bottom side of the vehicle steering knuckle, and wherein the ball stud is adapted to be received through the tapered hole and the headed sleeve from the top side of the steering knuckle, and wherein the shoulder is adjacent the ball end and faces in a direction of and is adapted to engage the top mounting surface of the vehicle steering knuckle arranged perpendicular to the shaft.

9. The ball joint relocation kit of claim 8, wherein the tapered hole tapers inwardly as the tapered hole extends from the first end to the second end thereof, and wherein an outer diameter of the shaft is less than a diameter of the tapered hole at the second end thereof.

10. The ball joint relocation kit of claim 8, further comprising an internally threaded nut adapted to threadably engage the threaded end of the shaft, and wherein the internally threaded nut is axially advanced along the shaft in a direction of the ball end to drive the headed sleeve into the tapered hole and pull the shoulder against the top mounting surface of the vehicle steering knuckle.

11. The ball joint relocation kit of claim 10, wherein the headed sleeve has an axial passage therethrough and is inserted into the tapered hole such that the headed end faces and engages the internally threaded nut.

12. The ball joint relocation kit of claim 8, wherein an axial length of the headed sleeve is greater than a depth of the tapered hole.

13. The ball joint relocation kit of claim 8, wherein a length of the ball stud is greater than a length of the headed sleeve and a depth of the tapered hole.

14. The ball joint relocation kit of claim 8, wherein the headed sleeve is rigid or elastomeric.

15. The ball joint relocation kit of claim 4, wherein the tapered outer diameter of the sleeve ends at the head, the head defining a flat annular face that faces in the direction of and engages a flat face of the internally threaded nut such that axially advancing the internally threaded nut along the shaft drives the sleeve further into the tapered hole.

16. The ball joint relocation kit of claim 10, wherein the tapered outer diameter of the headed sleeve ends at a head of the headed sleeve, the head adapted to face and engage the internally threaded nut.

17. A ball joint relocation kit for mounting in a tapered hole formed through a steering knuckle, the tapered hole including a constant taper as the tapered hole extends from a first end thereof disposed at a bottom side of the steering knuckle to a second end thereof disposed at a top side of the steering knuckle, the ball joint relocation kit comprising:
- a ball stud having a ball end, a shoulder adjacent the ball end, a shaft having a straight outer diameter, and a threaded end;
- a sleeve having a tapered outer diameter ending at a head and a straight inner diameter, the sleeve configured to have the shaft of the ball disposed therethrough, wherein a taper of the outer diameter of the sleeve matches the taper of the tapered hole of the steering knuckle;
- a nut configured to engage the threaded end of the ball stud;
- wherein a surface of the shoulder of the ball stud is parallel with a surface of the head of the sleeve and the surface of the head of the sleeve is configured to engage a surface of the nut.

* * * * *